(12) United States Patent
Verrall (10) Patent No.: US 11,459,203 B2
(45) Date of Patent: Oct. 4, 2022

(54) ADHESIVE TAPE DISPENSER

(71) Applicant: JJS APPLICATION TECHNOLOGIES LTD, Coventry (GB)

(72) Inventor: Luke Verrall, Coventry (GB)

(73) Assignee: JJS APPLICATION TECHNOLOGIES LTD, Coventry (GB)

(*) Notice: Subject to any disclaimer, the term of this patent is extended or adjusted under 35 U.S.C. 154(b) by 0 days.

(21) Appl. No.: 17/084,039

(22) Filed: Oct. 29, 2020

(65) Prior Publication Data
US 2021/0130121 A1    May 6, 2021

(30) Foreign Application Priority Data

Oct. 30, 2019  (GB) .................................. 1915759.3

(51) Int. Cl.
*B65H 35/00*  (2006.01)
*B32B 38/18*  (2006.01)
*B65C 9/18*  (2006.01)

(52) U.S. Cl.
CPC ....... *B65H 35/006* (2013.01); *B65H 35/0013* (2013.01); *B32B 38/185* (2013.01); *B65C 9/1803* (2013.01); *B65H 2301/4492* (2013.01); *Y10T 156/1075* (2015.01); *Y10T 156/1339* (2015.01)

(58) Field of Classification Search
None
See application file for complete search history.

(56) References Cited

U.S. PATENT DOCUMENTS

| 1,857,117 | A | * | 5/1932 | Diot | ...................... B65B 7/2864 |
| | | | | | 156/450 |
| 5,772,839 | A | * | 6/1998 | Nagate | ................ B29C 63/0013 |
| | | | | | 156/522 |
| 2005/0161161 | A1 | | 7/2005 | Sharp et al. | |

FOREIGN PATENT DOCUMENTS

EP     0325855 A2    1/1988

* cited by examiner

*Primary Examiner* — Linda L Gray
(74) *Attorney, Agent, or Firm* — McCoy Russell LLP (57) ABSTRACT

An adhesive tape dispenser head assembly arranged to dispense pieces of adhesive tape onto an object can include: a feed spool arranged to hold adhesive tape; a tape launcher arranged to launch the adhesive tape onto the object; a first brake arranged to move between an applied position, in which the tape brake is arranged to press the tape against the tape launcher, and an unapplied position; the tape launcher being arranged to move between a braked position, in which the first brake can be applied to the tape launcher, and an unbraked position, in which the tape is free to move relative to the tape launcher; a second brake arranged to facilitate positioning of the tape launcher in the braked position; a tape cutter movable between a cutting position, in which the tape cutter is arranged to cut the tape, and a non-cutting position; and a co-ordination mechanism arranged to co-ordinate relative movement between the tape launcher, the tape cutter, the first brake and the second brake such that when the tape cutter is in the cutting position, the tape launcher is in the braked position and the first brake is in the applied position.

16 Claims, 6 Drawing Sheets

ADHESIVE TAPE DISPENSER

CROSS REFERENCE TO RELATED APPLICATIONS

This application claims priority to Great Britain Patent Application No. 1915759.3 filed Oct. 30, 2019, which is incorporated by reference herein in its entirety.

BACKGROUND

This invention relates to an adhesive tape dispenser head, an adhesive tape dispenser machine including said head and a method of dispensing adhesive tape.

Particularly, but not exclusively, the invention relates to an apparatus and method with launch and cutting facility for dispensing pieces of adhesive tape onto an object. Ideally, but not essentially, tape is launched from the head such that its velocity matches the velocity of an object to which it is to be adhered.

Dispensing machines having dispensing heads that include cutters are used to dispense pieces of tape onto a moving object. In such dispensing machines (e.g. as disclosed in EP2078689), cutting of the tape to a desired length and dispensing of the cut tape precisely onto the object requires co-ordination between the cutting element and the dispensing element. This can be achieved via computer control—the head is a stand-alone element with its own control electronics which receives the work information from another master system via an interface of digital signals or via a network protocol. Objects are to be fed manually, or in an automated manner, onto a conveyor that conveys the objects past the dispenser head assembly. One or more speed and position sensors can provide data on the movement of the object relative to the head to a central processor, which co-ordinates dispensing of adhesive tape from the dispensing head onto the object when the object is in a correct position during its movement path. The cutting mechanism of the dispensing head is controlled by the central processor such that a desired length of tape is cut during the dispensing process.

In existing dispensing machines (e.g. of the type described in EP2078689), when a next piece of tape is to be attached to the moving object, the free end of the piece of tape is placed or pressed onto the object at the desired position in order to facilitate correct attachment. This placement/pressing is achieved, usually, by a dispensing head component that is movable (via a pneumatic or electronic drive) between a tape depositing position, in which the component bears against the tape to keep the tape tense and deposit the tape onto the moving object and an unengaged position in which the component does not deposit the tape onto the moving object. After the tape has been placed/pressed onto the moving object, the free end of the tape adheres to the object and the movement of the object pulls further tape along onto the object. The dispensing head includes a cutter arranged to cut the tape to a desired length. The dispensing machine also may include a freely rotating pressing roller arranged to press the tape onto the moving object to provide a clean, consistent application of pieces of tape onto the moving object.

Cutting of the tape is usually achieved by stabbing, with a blade, the tense tape from one side of the tape at a predefined point or location.

Furthermore, especially when cutting different types of tape, e.g. tapes of different materials or thicknesses, it is challenging to cut through the tape consistently (to achieve a good quality cut) at speed—a cutting blade tends to wear out quickly as a result of cutting inconsistency. Examples of tapes include simple one-sided tapes, two-sided tapes, foam tapes. Typical object materials include paper, cardboard, plastic (e.g. for laminate flooring) and fabrics—this list is not exhaustive. Objects with adhered tapes are used in many different markets, such as point-of-sale, printing, signage, flooring and promotional materials—this list is not exhaustive.

SUMMARY

Representative features are set out in the following clauses, which stand alone or may be combined, in any combination, with one or more features disclosed in the text and/or drawings of the specification.

According to a first aspect of the invention we provide an adhesive tape dispenser head assembly arranged to dispense pieces of adhesive tape onto an object, the assembly comprising: a feed spool arranged to hold adhesive tape; a tape launcher arranged to launch the adhesive tape onto the object; a first brake arranged to move between an applied position, in which the tape brake is arranged to press the tape against the tape launcher, and an unapplied position; the tape launcher being arranged to move between a braked position, in which the first brake can be applied to the tape launcher, and an unbraked position, in which the tape is free to move relative to the tape launcher; a second brake arranged to facilitate positioning of the tape launcher in the braked position; a tape cutter movable between a cutting position, in which the tape cutter is arranged to cut the tape, and a non-cutting position; and a co-ordination mechanism arranged to co-ordinate relative movement between the tape launcher, the tape cutter, the first brake and the second brake such that when the tape cutter is in the cutting position, the tape launcher is in the braked position and the first brake is in the applied position.

When the tape launcher moves from the braked position to the unbraked position: initially the first brake may remain in the applied position such that the tape is gripped between the first brake and the tape launcher; and subsequently, the first brake may move to the unapplied position such that the tape is freed and thereby launched onto the object. The second brake may comprise a wall or barrier arranged to abut against the tape launcher thereby facilitating positioning of the tape launcher in the braked position. When the tape launcher is in the braked position, the first brake and the second brake may be arranged to press against the tape and the tape launcher from opposite sides. The tape launcher may comprise a rotating launch roller. The rotating roller may be a unidirectional rotating launch roller. The tape launcher may comprise a rotating launch roller, and wherein in the braked position, abutment of the launch roller with the wall or barrier is arranged to brake rotation of the launch roller. The adhesive tape head may further comprise a cutter positioning mechanism arranged to facilitate positioning of the tape cutter in the cutting position, and optionally wherein the second positioning member comprises a mechanical stop. The first brake may comprise a handle arranged to facilitate manual movement of the brake from the applied position to the unapplied position, or may comprise a pivoted brake, the pivoted brake being arranged to pivot between the applied position and the unapplied position.

The first brake may comprise: a brake biasing mechanism arranged to bias the first brake to the applied position; and a brake release mechanism arranged to move the first brake against the action of the biasing mechanism towards the unapplied position. The brake release mechanism may comprise a release member, such as a release post, the first brake being movable relative to the release member, and wherein the release member is arranged to bear against the first brake, optionally against the handle, to move the first brake against the action of the biasing mechanism during movement of the tape launcher from the braked position to the unbraked position. The tape cutter may comprise a sheath and a retractable blade therein, and wherein the movement of the blade and sheath are controlled such that: the blade is retracted in the sheath in the non-cutting position; as the tape cutter moves from the non-cutting position to the cutting position: initially the blade is retracted in the sheath; and subsequently, prior and near to the cutting position, the blade is arranged to exit the sheath to cut the tape; as the tape cutter moves from the cutting position to the non-cutting position immediately after cutting the tape, the blade is arranged to retract into the sheath and subsequently the blade remains retracted in the sheath as the tape cutter moves to the non-cutting position. The tape cutter may comprise a sheath and a spring-loaded retractable blade therein, wherein the blade is exposed from the sheath only near the cutting position immediately before and after cutting the tape. The adhesive tape dispenser head assembly may comprise a cutter clearance mechanism arranged to move the tape cutter clear of the tape prior to initiating movement of the tape launcher from the braked position.

The tape launcher may be arranged to launch the adhesive tape onto the object such that, upon initial contact between the tape and the object, the speed of the tape substantially matches the speed of the object. The tape launcher may be further arranged, after the launching operation, to allow the tape to flow freely past via the action of the adhered tape on the object, or may be further arranged to hold the tape after the tape has been cut and prior to subsequent launch of the tape. The co-ordination mechanism may comprise a co-ordinated drive mechanism arranged to drive relative movement between the tape launcher, tape cutter, first brake and second brake.

The adhesive tape dispenser head assembly may comprise an assembly frame, wherein the tape launcher, the tape cutter, the first brake and the second brake are mounted to the assembly frame. Further, the assembly may comprise a launch module comprising the tape launcher and the first brake; and a cutting module comprising the tape cutter, wherein the launch module and the tape cutter are movably mounted to the assembly frame, the second brake is fixedly mounted to the assembly frame, and the co-ordinated drive mechanism is arranged to drive movement of the launch module and the cutting module, and optionally: wherein the co-ordinated drive mechanism comprises a motor and a gearing arrangement between the launch module and the cutting module.

The tape cutter may comprise a single blade arranged to cut the tape from only one side, and optionally wherein the blade comprises a profiled blade arranged to initially pierce the tape at a single location. The co-ordination mechanism may comprise a controller arranged to control and co-ordinate relative movement between the tape launcher, the first brake, the second brake and the tape cutter. Further, the controller may be arranged to control the relative movement based on: (a) object speed information relating to the relative speed of the object compared to the dispenser head assembly; or (b) presence information relating to detection of the presence of the object at a first location or position information relating to the relative position of the object compared to the dispenser head assembly; or (a) and (b). In addition, the object may be conveyed on a conveyor and the object speed information is determined from the conveyor speed; and/or the object speed information may be directly sensed by an object speed sensor; and/or the object speed information may be input via a user interface; and/or the object speed information and the position information may be pre-programmed.

The adhesive tape dispenser head assembly may further comprise a guide arrangement to guide the adhesive tape from the feed spool to the tape launcher, and optionally wherein the guide arrangement comprises one or more guide rollers, such as one or more freely rotating rollers, and further optionally a first guide roller is located on the launch module upstream of the tape launcher and a second guide roller is located on the launch module downstream of the tape launcher. The adhesive tape dispenser head assembly may further comprise attachment device arranged to facilitate attachment of the assembly to a tape applicator machine.

In another aspect, we provide a tape application machine comprising a conveyor for conveying an object upon which tape is to be applied and an adhesive tape dispenser assembly according to the first aspect attached thereto and arranged to dispense pieces of adhesive tape onto the object.

In another aspect, we provide a method of dispensing pieces of adhesive tape onto an object comprising:

obtaining relative object speed and presence information; in response to the relative object speed and presence information, using the tape launcher, the tape cutter and the first and second brakes of the first aspect to launch, brake, cut and dispense pieces of adhesive tape onto the object such that, upon initial contact between the tape and the object, the speed of the tape substantially matches the speed of the object. Further, obtaining relative object speed information may comprise: when the moving object is conveyed on a conveyor, determining the object speed from the conveyor speed; measuring the object speed; obtaining pre-programmed object speed information and position information; or obtaining object speed information input via a user interface.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

BRIEF DESCRIPTION OF THE DRAWINGS

Embodiments of the invention will now be described, by way of example only, with reference to the accompanying drawings, in which.

DETAILED DESCRIPTION

Figure 1:
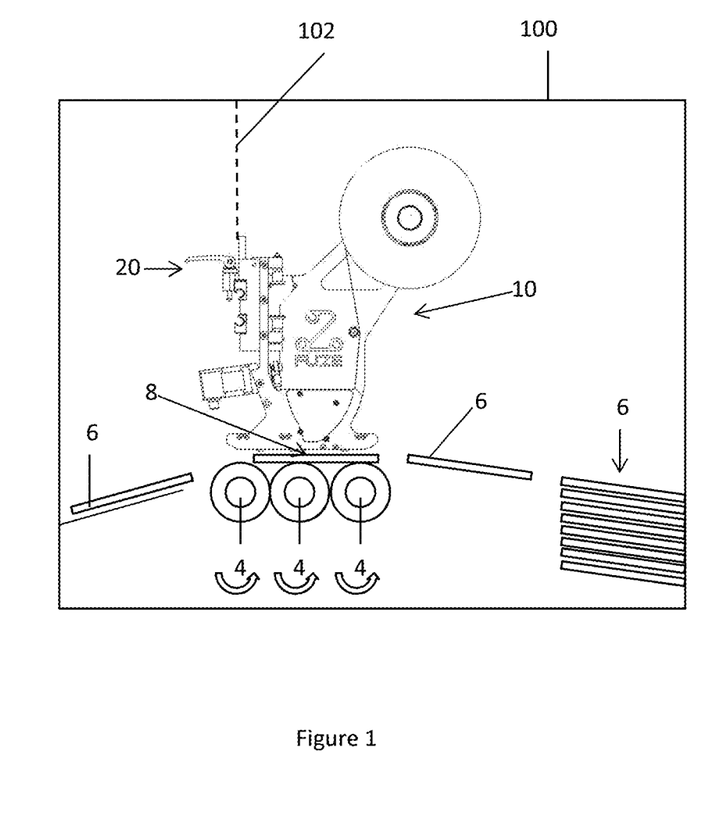
FIG. 1 shows schematically parts of a tape application machine according to an aspect of the invention.

Referring to FIG. 1, there is shown part of a tape application machine 100, according to an embodiment of the invention, which is used to apply pieces of tape to objects in a controlled, desired manner. The tape application machine 100 includes a conveyor system, which in this embodiment comprises three conveyor rollers 4 arranged in a standard manner. Curved arrows in FIG. 1 show the rotation directions of the conveyor rollers 4. Objects 6 upon which tape pieces are to be applied travel on the conveyor rollers 4 through a deposition zone 8, past an adhesive tape dispenser head assembly 10 according to the invention, which is arranged to cut and deposit tape pieces on to the objects. In other embodiments, the conveyor system may comprise a different number of rollers. In other embodiments, the conveyor system may comprise a non-roller system, such as a driven track or belt that conveys objects through the deposition zone 8—the belt or track may be driven by rollers or axles or any other suitable mechanism.

In this embodiment, objects 6 are manually fed to the conveyor system. In other embodiments, objects 6 may be automatically fed to the conveyor system by an automated feeder. In some embodiments, there may be a guide mechanism, such as a rail to ensure correct lateral alignment of an object through the deposition zone (e.g. an edge of the object may be aligned with the guide mechanism such that the object is correctly presented in the deposition zone).

The tape application machine comprises a machine frame 102 to which the adhesive tape dispenser head assembly (of one embodiment of the invention) 10 is attachable. Attachment between the machine frame 102 and the dispenser head assembly 10 is such that the conveyor rollers 4 convey objects in a controlled manner past the attached dispenser head assembly 10. The machine frame comprises a gantry upon which one or more dispenser head assemblies can be mounted in a conceptually known manner. Typically multiple head assemblies can be mounted across a gantry such that objects passing thereunder can have tape pieces applied at one or more locations across their width. For ease, the invention will be described with reference to a single dispenser head assembly, although the invention might be used with multiple dispenser head assemblies. In this embodiment, the assembly is fixed and stationary relative to the machine frame 102. In other embodiments, the head assembly may move relative to a machine frame, and the object or objects upon which tape is to be adhered may be stationary. Or, both the head and the object(s) may move in other embodiments.

Apart from the dispenser head assembly 10, the rest of the machine is of standard construction. The inventive dispenser head assembly may be retro-fitted to an existing adhesive tape dispensing machine that is able to receive head assemblies.

The dispenser head assembly 10 includes attachment device 20 for releasably attaching the assembly to the machine 100, and in particular to the machine frame 102 of the machine. In this example, the attachment device 20 is in the form of a clamp module operable by a handle. The clamp module is arranged to clamp to a corresponding part of the machine frame when correctly aligned therewith. The handle moves the clamp mechanism between an open configuration in which the assembly is not attached to the machine, and a clamped configuration in which the clamp secures against a corresponding part of the machine frame to secure the assembly on the machine. The attachment device 20 may have a quick release mechanism.

The objects 6 pass through the deposition zone 8 where the depositing of tape pieces onto a passing object occurs. In this embodiment, the invention includes known means for detecting the presence of a passing object and predicting when it is in correct position in the deposition zone for having a tape piece deposited upon it. In other embodiments, the relative position between the head assembly and the object is otherwise provided—for example, in embodiments having a moving head assembly movable over a stationary object, the object may be located in a known position and orientation on a reference bed, and the moving head assembly may be calibrated such that the precise alignment relative to the object is known.

Each tape piece is of a desired size (length) and is precisely positioned on each object as it passes through the deposition zone 8. The machine of this invention can achieve speeds of 80 to 100 m/minute, even when depositing different types of tape. This is a significant improvement over existing machines and features that lead to this effect are described below. The features need not necessarily be used in combination. Each feature offers an advantage over existing machines.

In machines that use replaceable dispenser head assemblies, it is challenging to provide a compact arrangement, as the present solution elegantly provides, because of the requirement to co-ordinate a complex cutting mechanism with a depositing mechanism. Dispensing pre-cut or preformed adhesive labels onto an object such as a moving object (e.g. on to objects such as envelopes) is not so complicated because machines for such dispensing do not require such complex cutting mechanisms, since the labels are already formed as desired, perhaps with a pre-cut or score. In this invention, a further complex launch and brake mechanism has also been provided. This launch and brake mechanism provides a cleaner cut and also allows use with a wide range of tapes, which are traditionally difficult to cut effectively with the required speed of throughput. The braked launch mechanism allows use with light substrates, which can be easily creased, torn etc. when adhering a tape thereto. Machines with replaceable heads are more versatile—different heads might be used in different configurations depending upon the specific tape and object combination. Different numbers of heads can be mounted in parallel onto the machine frame such that multiple pieces of tape can be applied across the width of an object passing through the machine. Machines with replaceable heads are also easier to service and repair than those without such heads. It can be seen that replaceable dispenser head assemblies are subject to different technical requirements than machines for dispensing pre-cut labels.

The adhesive tape dispenser head assembly 10 is arranged to automatically dispense pieces of adhesive tape onto a moving object 6. The pieces of tape are cut from a roll of adhesive tape 12. In this example, the tape is a standard one-sided adhesive tape and is provided without a backing liner.

In other embodiments, other tapes having different properties (e.g. thicker or thinner tapes or tapes with or without a backing liner) may be cut and dispensed using the head assembly of this invention. If a liner is present, then in order for these materials to bond to the passing substrate/object, the liner needs to be removed to expose the adhesive so that it can stick to the passing substrate. Double sided adhesive tapes already typically have one side exposed as they pass from a feed mechanism through the dispenser head assembly—double sided adhesive tapes do not normally need the liner covered side to be removed; although, this can also be an option and sometimes desirable. Advantageously, this invention provides a head assembly that can be used with a broad range of tapes whilst still providing pieces of tape that have clean, consistent cuts and whilst operating at desired speeds.

Figures 2, 3:
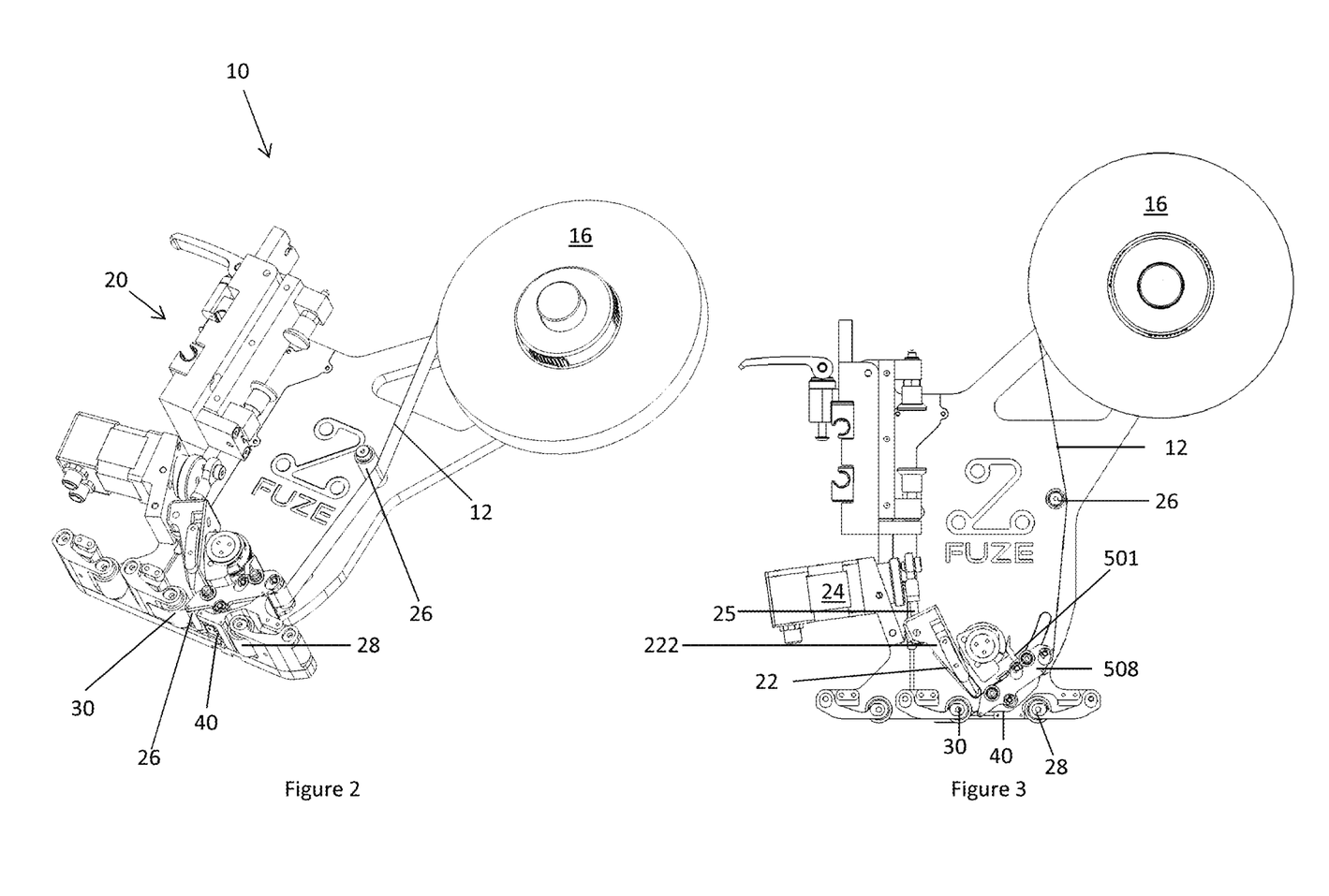
FIG. 2 shows schematically a part of an adhesive tape dispenser head assembly according to another aspect of the invention.
FIG. 3 shows schematically the adhesive tape dispenser head assembly of FIG. 2 from one side.

As shown in FIG. 2, the assembly 10 comprises: a feed spool 16 arranged to hold the adhesive tape 12. In other embodiments (in which the tape is provided on a backing liner), the assembly 10 may also comprise a take-up spool arranged to hold the backing liner after the tape has been peeled off therefrom.

The assembly 10 also includes a tape launcher, a tape cutter and a tape brake. In this embodiment, the tape brake comprises two parts: a first brake and a second brake.

The tape 12 is arranged to travel downstream from the feed spool to the tape launcher, which is driven and movable to launch the adhesive tape onto the moving object passing through the deposition zone 8. After passing the tape launcher, the tape moves downstream to the tape cutter, which is arranged to cut the tape to a desired length. The tape launcher and the tape cutter (and therefore, in this example, the integral brake too) are connected to a motor 24, which drives movement thereof. In this embodiment the motor is a servomotor, which allows precise movement of the tape launcher and the tape cutter between their configurations. The two-part tape brake is arranged to brake the tape at the time of the cutting operation in order to facilitate providing an accurate, reliable and efficient cut. The precise form of the tape launcher, cutter and brake of this embodiment is described in further detail below.

The tape 12 is arranged to travel from the tape launcher further downstream to the deposition zone 8. To achieve this, the tape launcher is arranged to launch the tape such that when the tape first contacts the moving object 6 in the deposition zone, the tape is already moving in a direction substantially parallel to the object movement direction, or the tape has a velocity with a significant speed component in a direction parallel to the movement direction of the object. The aim is to have the tape and object travelling at the same speed in the same direction as far as possible at the moment of impact to reduce disruption when the tape meets the moving object. At least, upon contact, the relative velocity between the tape and the object should be less than the relative velocity between the assembly and the object—thereby an advantage relative to existing depositing systems (of the type where tape is merely pressed on to a passing object) is provided. In this way, this invention advantageously provides the ability to reliably adhere a wide range of types of tape reliably to an object.

The launch feature of this invention provides an improvement in reliably adhering tape to an object (particularly when the tape is relatively heavy compared to the object) compared to simply pressing stationary tape onto a moving object.

In this embodiment, the tape launcher is arranged to launch the adhesive tape onto the moving object such that, upon initial contact between the tape and the object, the speed of the tape substantially matches the speed of the object. In some embodiments, the launch speed of the tape might be from 70% of the speed of the moving object. In some embodiments, the launch speed of the tape might be up to 110% of the speed of the moving object. In some embodiments, the launch speed of the tape might be between 70% and 110% of the speed of the moving object. In embodiments in which the tape head moves and the object is stationary, or in which both move, then the tape is launched such that the relative speed between the tape and the object is about zero (zero or +/−30%) upon initial contact between the tape and the object.

Launching and cutting the tape is co-ordinated such that the right amount of tape is adhered in the right location to the object or substrate. Co-ordination can be computer controlled in a similar manner to that described in known machines, as described in the background section. Sensors in such a system may be mounted or located on the dispenser head assembly or remotely (e.g. on the machine itself). Information gathered from the sensors is traditionally useful to coordinate cutting and depositing tape. In this invention, the information is also used to coordinate launching the tape prior to cutting. In this embodiment, precise control can be achieved by using a single servomotor to drive the cutting and the launching—this is particularly important for co-ordinating the launching, which must be precise and is often at high speed. Example speeds of the conveyed object are as cited above. Instead of being sensed, speed information may be known due to knowledge of the precise relative speed and position relationship between the object and the head assembly. For example, in embodiments with a movable head and a stationary object, the head may move in a controlled manner in which its speed and position are known or monitored. This leads to relative speed and position information that is useful to co-ordinate precise launching and cutting of the tape. Precise launching includes taking into account the distance from the tape launcher to the deposition zone, and the relative speed and position information to determine when the object will be in the deposition zone.

The tape 12 has two sides and, in this embodiment, the tape is engaged from both sides during the launch operation. In this embodiment, the tape launcher comprises a first launch member arranged to engage the tape from one side of the tape. The tape brake comprises a first brake 501 and a second brake 502—the first brake 501 is arranged to engage the tape from the other side of the tape to co-operate with the first launch member to provide the launch operation—both of the first launch member and the first brake are movable and are arranged to cooperatively launch the tape during the launching operation. In various examples, the tape brake is urged towards the first launch member, or vice versa or both—so that the tape is well gripped therebetween.

In this embodiment, as shown in the figures, the tape launcher comprises the first launch member, which is in the form of a freely rotating launch roller 21 and the first brake is arranged to work co-operatively with the launch roller 21 as described in further below. In this embodiment, the freely rotating roller comprises a one-way freely rotating roller so that the roller is able to rotate freely in a forward direction in which tape can be dispensed towards the object, but not in an opposite, reverse direction—this prevents recoil of tape, which leads to more accurate tape positioning, cutting and dispensing.

In this embodiment, the freely rotating roller 21 is always in contact with the tape. This may not be the case in other embodiments. In this embodiment, the roller 21 has a regularly shaped outer surface and its entire outer surface is used to grip and launch the tape. In this embodiment, the roller 21 comprises a launch roller sleeve mounted on a launch roller axle. Advantageously, it is possible to change the sleeve to alter the function of the launching operation—the whole launching assembly need not be changed. For example, if a particular sleeve surface is required for a particular tape, then a bespoke sleeve having a suitable surface can be provided. For example, in some embodiments, a tape engaging surface of the tape launcher roller 21 comprises a high-grip, and optionally a low-adhesion, material, such as silicone rubber—this aids gripping and is therefore useful to transmit braking force and launching force from the launcher to the tape. Furthermore, the anti-adhesive properties mean that the tape does not stick to the rollers and so machine blockage frequency can be reduced.

In some embodiments, the or each roller surface is configured to be flexible in a radial direction such that a relatively wide range of tapes of differing thickness can be accommodated through the tape launcher. The roller surface may comprise a silicone rubber material, such as a softer silicone rubber material. The radial flexibility is provided in one this particular example by having a roller surface with gaps between parts of the surface that are arranged to contact the tape. The gaps allow some movement of the parts of the surface that are arranged to contact the tape such that radial flexing is facilitated. The gaps and the parts of the surface that are arranged to contact the tape may run parallel to each other in a direction of travel of the tape. Radial flexing may not be required, or not much may be required, when a thin tape passes through the tape launching cutter, whereas more radial flexing may be required when a thick tape passes through the tape launching cutter—the same flexible roller surface can work with thinner tapes and thicker tapes. In some such examples, advantageously the same flexible roller surface can work with tape thicknesses from 0.1 mm to 0.3 mm. In some such examples, the roller surface depth (i.e. depth of silicone rubber material) is about 5 mm, and the depth of the gaps is about 1.5 mm. The skilled person will understand that this feature is not limited to these examples.

In some examples, the silicone rubber material may comprise a hard silicone rubber material, and may comprise a silicon surface layer about 0.1 mm to 2 mm thick.

The tape brake comprises the first brake 501 and the second brake 502. The tape brake is arranged to brake the tape when the tape cutter is at or near the cutting position. The braking force is sufficient to bring the tape to a standstill or at least to decrease the tape speed (compared to its regular dispensing speed) to a desired speed to allow a cleaner cut. The brake has the effect of reducing the tape speed as the cutter reaches the cutting position (i.e. first engages the tape during the cutting operation), or before the cutter reaches the cutting position.

Referring to FIGS. 5*a* to 5*d*, the first brake is arranged to move between an applied position, in which the first brake is arranged to press the tape against the tape launcher, and an unapplied position in which the tape is free to move past the tape launcher. In this embodiment, the first brake 501 comprises a pivoted brake, the pivoted brake being arranged to pivot between the applied position and the unapplied position.

The first brake comprises a mechanical brake in the form of a brake pad 504. The brake pad 504 is made of a strong, light metal alloy in this embodiment—in this case, the alloy is an aluminium alloy, such as ERGAL. Using a mechanical brake facilitates consistent, repeatable braking at precisely the correct moment (relative to the cutting operation).

In some embodiments, the first brake may comprise a brake claw instead of a brake pad.

The pivoted brake is generally L-shaped, having two branches—the pad (or other mechanical brake) is provided on one branch, and the other branch comprises a handle 506, which can be used to pivot the first brake between its two positions.

In this embodiment, the first brake comprises: a brake biasing mechanism (not shown) arranged to bias the first brake to the applied position; and a brake release mechanism arranged to move the first brake against the action of the biasing mechanism towards the unapplied position. Operation of the handle 506 (i.e. pressing against the handle) moves the first brake towards the unapplied positon.

In this embodiment, the handle 506 is arranged to facilitate manual movement of the brake from the applied position to the unapplied position—such manual operation may be useful when a user initially sets up the assembly prior to first use. The handle can be pressed and tape manually fed and correctly positioned into the launcher.

The assembly comprises an assembly frame comprising a back plate and a front plate—components of the assembly are attached to one, other or both plates. FIGS. 2 and 3 show one plate removed for ease of viewing components. The plates facilitate stable, aligned mounting for components, protect the components of the assembly, and also provide safety (accident prevention) for operators of the assembly and machine from the moving parts. A service window may be provided in one of the plates. The service window is easily openable/removable to repair or replace components of the assembly accessible therethrough.

As previously described, in this embodiment, the first brake assists in the launching operation. The first brake and the tape launcher together form a launch module. The launch module comprises a launch frame 508. The launch roller 21 and the first brake 501 are both mounted to the launch frame 508. The first brake 501 is pivotally mounted to the launch frame 508 such that it pivots relative to the roller 21 and between its applied (FIG. 5*b*) and unapplied (FIG. 5*a*) positions.

The launch module is able to move relative to the assembly frame between a braked position, in which the first brake can be applied to the tape launcher, and an unbraked position, in which the tape is free to move relative to the tape launcher.

The brake release mechanism further comprises a release member, in the form of a release post 505 mounted fixedly to the assembly frame (e.g. to one, either or both plates), the first brake being movable relative to the release member, and wherein the release member is arranged to bear against the handle 506, to move the first brake against the action of the biasing mechanism during movement of the tape launcher from the braked position to the unbraked position.

The assembly frame comprises a launch module slot 510 in the back plate. The launch module is slidably mounted in the launch module slot 510 such that the launch module is slidable between the braked position and the unbraked position. The tape launcher is fixed relative to the launch module and so movement of the launch module equates to movement of the tape launcher.

As the launch module moves from the braked position to the unbraked position, initially the first brake remains in the applied position such that the tape is gripped between the first brake and the tape launcher. Therefore, the tape is pulled along with the moving launch module. Then, when the post 505 contacts the handle 506, the first brake moves to the unapplied position such that the tape is freed and thereby launched onto the object. In other embodiments, the first brake may not have any launching effect—instead, a completely distinct launcher may be provided, e.g. via first and second launch members that grip and throw the tape from opposite sides, and the distinct first brake may brake each launcher member.

The second brake 502 is arranged to facilitate positioning of the tape launcher in the braked position by abutting against the tape launcher when it reaches the braked position. Advantageously, the second brake ensures very consistent positioning of the launch roller in the braked position regardless of different tape types and different speeds of operation—the inventors found that having this positioning mechanism allows a wider range of tape types (different tape materials (e.g. some tapes are slippier than others)), thicknesses etc.) and operating conditions to be used with the same apparatus, whilst continuing to provide a reliable, accurate, high quality cutting operation.

In this example, the second brake comprises a wall 514 that is fixed to the assembly frame (e.g. to one, either or both plates). In other embodiments, the wall (or other barrier) may be formed integrally with the frame. In this embodiment, the wall 514 has a curved surface, whose profile corresponds to the shape of the launch roller surface—a large contact surface area is thereby provided in order to ensure a desired braking effect. In this embodiment, the second brake functions to position the launch roller (so that the effect of the first brake is enhanced), and also to brake rotation of the launch roller.

In another embodiment (see FIG. 7), the wall 514 is shaped like a hook or a claw, and impinges into the relatively soft rubber launcher roller 21, thereby providing a desired braking effect. In other embodiments, the wall may be any shape of barrier that is suitable to provide a stopping effect on the roller.

When the tape launcher is in the braked position, the first brake and the second brake are arranged to press against the tape and the tape launcher from substantially opposite sides. In some embodiments, effect of this feature may still be obtained so long as the first brake and the second brake exert force having any component towards each other such that a clamping effect is provided—i.e. it is not necessary for the first brake and the second brake to operate from substantially opposite sides.

The inventors found that having a two-part brake in which one brake allows accurate positioning of the tape launcher and the other brake presses the tape against the launcher provides an advantage compared to a single-part brake mechanism, e.g. a single, first brake. The two-part clamping brake feature of this invention means that the first brake in isolation need not be too severe in its pressing against the tape—this means that a wide range of tapes (some slippier than others) can be accommodated through the braked launching mechanism.

Furthermore, in this embodiment, since the first brake also provides some launching effect, it is advantageous that the first brake pressure against the tape and tape launcher is not unduly severe—a more responsive launch mechanism is compactly provided. The risk of disrupting tape from its intended flow path during the launch is reduced.

The first brake applies sufficient pressure to the tape to keep the tape pressed against the launch roller when the launch roller 21 moves from its braked position when the first brake is applied to the point at which the first brake is no longer applied. When the launch roller 21 moves in the other direction (i.e. from its unbraked position to its braked position, the first brake alone does not apply sufficient pressure to completely brake the tape. When the tape launch roller 21 reaches the wall (i.e. when the second brake is applied), the combination of the first brake and the second brake is sufficient, in combination, to lock the tape such that the blade can cut the tape consistently in the same position each time. It is noted that, in this example, the launch roller is a one-way roller—this mitigates the chance of the tape slipping during the launch operation.

Figure 5A:
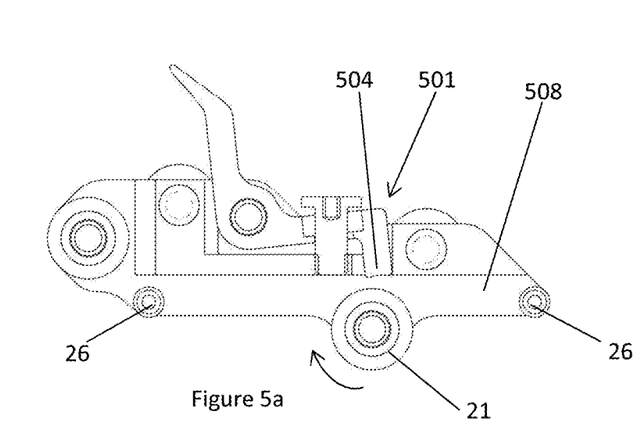
FIGS. 5a to 5d show schematically a braked tape launcher of the adhesive tape dispenser head assembly of FIG. 2 in different configurations.
Figure 5B:
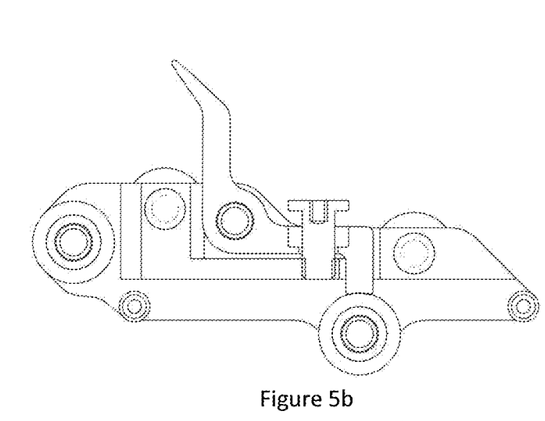
Figure 5C:
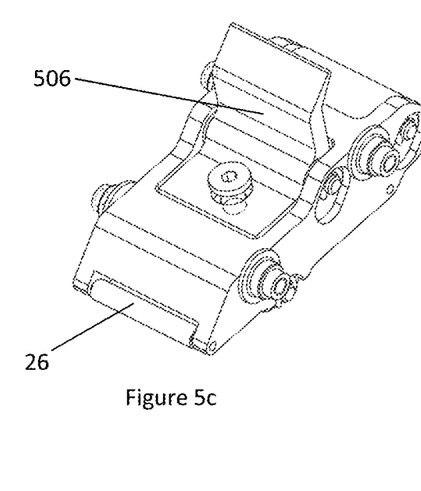
Figure 5D:
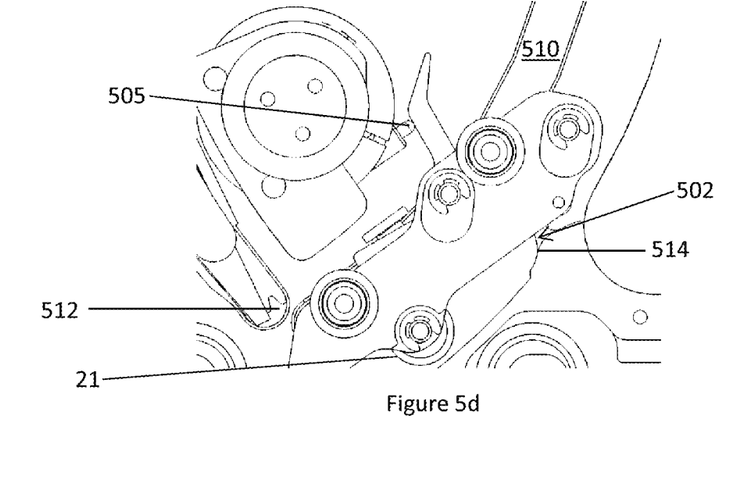

As seen in FIGS. 5a to 5c, the launch module also includes a pair of freely rotating guide rollers 26 positioned upstream of and downstream of the tape launch roller 21. The guide rollers 26 help to support the tape and keep the tape accurately on its intended path. The guide rollers are optional features.

In this embodiment, the tape cutter is movable between a cutting position, in which the tape cutter is arranged to cut the tape to a desired length, and a non-cutting position. The tape cutter comprises a sheath 222 and a retractable blade 22 therein. The movement of the blade and sheath are controlled such that the blade is retracted in the sheath in the non-cutting position. As the tape cutter moves from the non-cutting position to the cutting position: initially the blade is retracted in the sheath; and subsequently, prior and near to the cutting position, the blade is arranged to exit the sheath to cut the tape. As the tape cutter moves from the cutting position to the non-cutting position immediately after cutting the tape, the blade is arranged to retract into the sheath and subsequently the blade remains retracted in the sheath as the tape cutter moves to the non-cutting position.

In this embodiment, the blade comprises a spring-loaded retractable blade, wherein the blade is exposed from the sheath only near the cutting position immediately before and after cutting the tape.

The assembly frame comprises a cutting sheath slot 512 in the back plate. The cutting sheath 222 is slidably mounted in the cutting sheath slot 512.

Figure 4A:
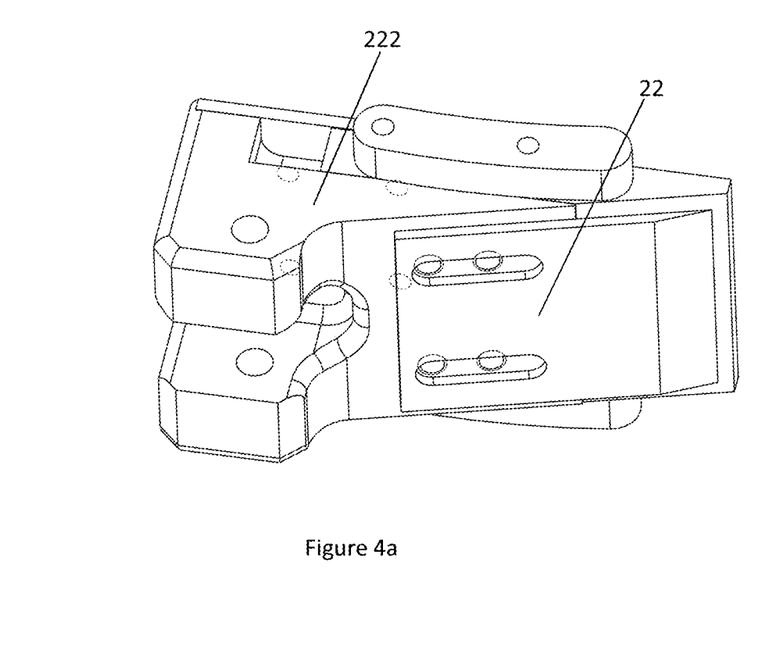
FIGS. 4a and 4b show schematically a tape cutter of the adhesive tape dispenser head assembly of FIG. 2 in different configurations.
Figure 4B:
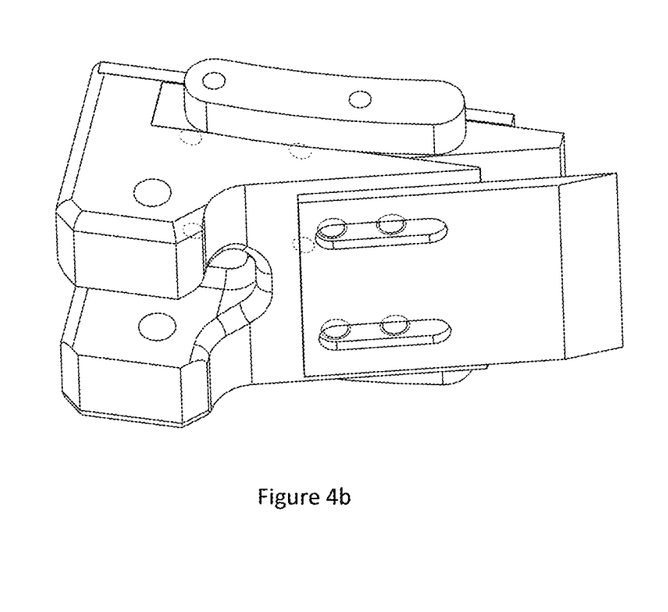

Movement of the tape cutter is driven by the motor 24 as previously described. The motor is linked to the blade 22 via drive shaft 25. The motor is a servomotor (or similar actuator) and drives between two extreme positions (e.g. Top Dead Centre and Bottom Dead Centre) that correspond to the cutting and non-cutting positions. In this example, the non-cutting position is at one extreme motor position. As the motor moves to the other extreme position, the sheath 222 is driven to slide through the cutting sheath slot 512. The sheath 222 reaches the end of the slot before the motor reaches its extreme position. The slot 512 thereby provides a mechanical stop against further movement of the sheath. Therefore, further movement of the motor towards its extreme position drives movement only of the blade 22 (not the sheath). The spring-loaded blade is therefore driven (against the action of the spring) out of the sheath 222 until the extreme motor position, which aligns with the cutting position (see FIGS. 4b, 6c and 7). (In this position, note that the tape launcher is in the braked position as described in more detail later.) Whilst the blade is in the sheath, it is not exposed; the blade is exposed only when needed—risk of injury to users is thereby reduced.

The head assembly 10 further comprises a guide arrangement for guiding the adhesive tape on its path from the feed spool to the tape launcher and also thereafter to the deposition zone. In this embodiment, the guide arrangement comprises multiple freely rotating guide rollers 26 along the path—these guide rollers 26 may be arranged in pairs or in isolation. The guide rollers 26 can be positioned to maintain tension in the tape, and also to keep the tape away from components of the assembly other than the tape launcher and tape cutter. The guide rollers may have surfaces made of a low friction material. In other embodiments, the guide arrangement may be a non-roller guide, such as a stationary contact rod with a low friction surface that allows the tape to slip therepast.

In this embodiment, the assembly also comprises a first press roller 28, which is located upstream of the deposition zone 8. When the assembly is correctly attached to the machine, components of the assembly 10 and the machine 100 are correctly aligned, including the first press roller 28 with the conveyor system. The first press roller 28 presses passing objects 6 against the conveyor rollers 4 to facilitate consistent presentation of objects through the deposition zone—this feature is desirable for consistent and accurate adhesion of tape pieces onto each object. In other embodiments, no press mechanism may be provided, or a different press mechanism may be provided, e.g. a non-roller presser.

Once the tape has made initial contact with the object (passing through the deposition zone in a neatly presented manner in this embodiment), the tape adheres to the object.

In this embodiment, the assembly also comprises a second press roller 30, which is located downstream of the deposition zone 8. The second press roller 30 presses the recently adhered tape piece against the object 6 to facilitate reliable and consistent adhesion therebetween. In other embodiments, no press mechanism may be provided, or a different press mechanism may be provided, e.g. a non-roller presser.

Either or both of the first and second press rollers may be adjustable in height (distance from the conveyor system) via first and second height adjustment mechanisms respectively to allow adjustment for different object thicknesses and different tape thicknesses. This feature is particularly useful for heavy or foam tapes (which tend to be thicker than other tapes).

As mentioned above, the tape 12 is pulled along by the movement of the adhered object (since the object is being conveyed by the driven conveyor system, i. e. in this embodiment the conveyor rollers 4)—the tape therefore grips and moves the launch roller, which rotates freely in this direction.

The invention relies on co-ordination of movement between the tape launcher, the tape cutter and the tape brake, and this will now be described in detail.

The head assembly 10 comprises a drive mechanism, which comprises the motor 24 that drives the tape launcher and the tape cutter (and therefore, in this example, the integral brake too). In this embodiment, the motor is an efficient, high torque motor, such as a servomotor.

In this embodiment, as mentioned previously, the motor directly drives the tape cutter—the motor 24 is connected, via the piston rod 25, to the cutting blade 22. In other embodiments, a cutter gearing arrangement may be provided between the motor and the cutter.

In this embodiment, the drive mechanism also comprises a launcher gearing arrangement between the tape cutter and the tape launch module. The motor drives the tape launcher via the launcher gearing arrangement. Therefore, the movement path of the tape launch module is precisely connected to the movement path of the tape cutter—the gearing mechanism ensures precise co-ordination of movement between the launcher, the brake and the cutter, all of which are precisely fixed to the assembly frame.

The motor is driven between two positions, e.g. a first motor position, TDC (top dead centre, e.g. 0 degrees) and a second motor position, BDC (bottom dead centre, e.g. 180 degrees). Movement from the TDC to BDC position can be considered as movement in the first direction, and movement from the BDC to TDC position can be considered as movement in the second direction. In some embodiments, one cycle of movement of the motor comprises actuation or rotation only in one sense, e. g. only anti-clockwise (e.g. from 0 through 90 through 180 through 270 to 360 degrees). In other embodiments, the motor is driven to rotate in multiple senses (e.g. from 0 through 90 through 180 through 90 to 0 degrees).

The speed of movement of the cutter and the launch module is precisely controlled by the controller. The relative movement between the lunch module and the cutter is precisely defined by the gearing arrangement therebetween, along with the second brake to further provide fine definition for the positioning of the launch roller when in its braked position.

In use, the controller drives the motor in cycles and the speed of each part of the cyclical movement is controlled according to a desired program that can be set by a user, or that is preset. The desired program takes into account one or more of the desired tape launch speed, the desired length of tape pieces and the desired spacing between tape pieces, the material of the tape, the thickness of the tape, and any other measurable factors that affect cutting or dispensing. A cycle of operation of the motor will now be described.

Figure 6A:
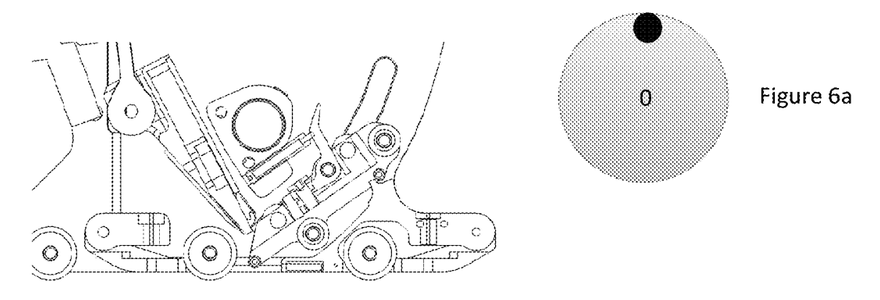
FIGS. 6a to 6c show schematically the adhesive tape dispenser head assembly of FIG. 2 in various configurations.
Figure 6B:
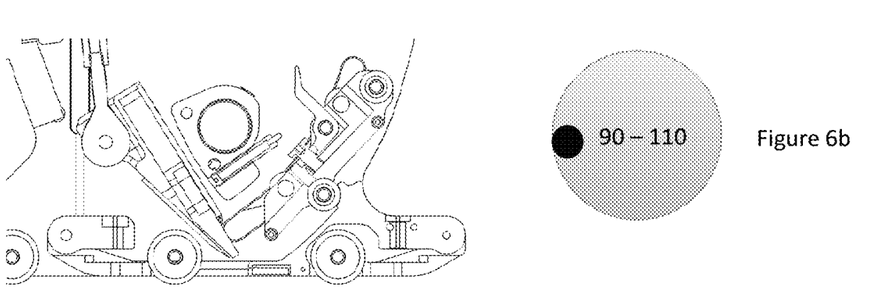
Figure 6C:
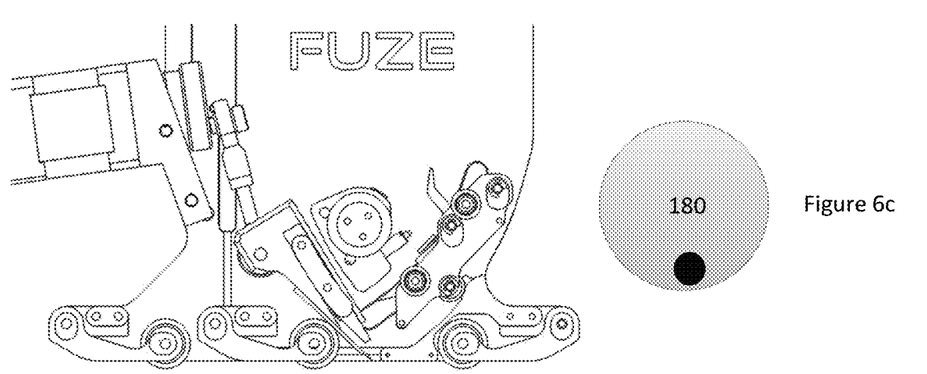

At the first motor position (0 degrees), the tape cutter is in its non-cutting position (see FIG. 6*b*), and at the second motor position (180 degrees), the tape cutter is in its cutting position (see FIG. 6*c*). The first and second motor positions are the maximum extent positions of the motor. In this embodiment: in the cutting position, the blade is at its lowest extent and therefore cuts the tape; and in its non-cutting position, the blade rests at its furthest position (at its highest extent) from the tape.

In this example, when the motor is in the 0 degrees (FIG. 6*a*) position, the tape cutter is in the non-cutting position (and the blade is safely retracted within its sheath)), whilst the tape launcher is in the unbraked position in which it is closest to the deposition zone, in this example. In this unbraked position, the tape brake is not applied since the release post 505 is engaged with the handle to force the first brake out of engagement with the tape launch roller—in use, during this part of the cycle, tape is adhered to the object and is pulled freely past the tape launcher by the movement, of the object through the deposition zone. The controller retains the assembly in this configuration for as long as required to dispense tape on the object according to a desired length of tape piece.

When cutting is desired, the controller controls the motor to move in the first direction away from 0 degrees towards the other extreme position, 180 degrees (FIG. 6*c*), i.e. to cause the cutter to move from the non-cutting position to the cutting position. In the cutting position, the blade 22 is arranged to cut the tape. The controller controls the movement such that cutting occurs at a precise time suitable to cut a desired length of tape. During the motor movement from 0 to 180 degrees, the sheath 222 slides through the cutting sheath slot 512 and the launch module correspondingly (due to the gearing arrangement) slides through the launch module slot 510. There are multiple phases of activity as will be described further.

When the motor position is travelling in the first direction from 0 to about 90 degrees (in some embodiments, this might be a different motor position), due to movement of the launch module through the launch module slot 510, the post 505 and the handle 506 disengage, causing the first brake to move to the applied position. At this precise disengagement point, the tape is still being pulled by the moving object to which it is adhered, and the first brake alone (i.e. without the second brake) is not sufficient (in this example) to completely brake the tape.

When the motor position is about 90 degrees (in some embodiments, this might be a different motor position, e.g. about 100 or 110 degrees), the sheath 222 abuts against the end of the cutting sheath slot 512 and is prevented from moving further (see FIG. 6*b*). As previously described, further movement of the motor in the first direction will move the blade 22 relative to the sheath. In some embodiments, the blade is recessed from the opening of the sheath such that first further movement of the motor initially does not cause the blade to be exposed and subsequent second further movement causes the blade to be exposed.

When the motor position is about 90 degrees (in some embodiments, this might be a different motor position), due to further movement of the launch module through the launch module slot 510, the launch roller 21 abuts against the wall 514 (see FIG. 6*b*)—the second brake therefore ensures that the launch roller is in the desired position for the first brake to be applied accurately and also in order to provide a combined clamping brake effect (as previously described) between the first brake and the second brake on the tape and the tape launcher.

As the motor moves in the first direction from 90 to 180 degrees (in some embodiments, this might be different motor positions), the launch roller 21 does not move further, the tape is effectively braked and the blade 22 moved out of the sheath to cut the tape—in this position (see FIG. 6*c*), the blade 22 is fully exposed, in this example. As previously described, the blade is exposed from the sheath only during this phase of operation around the cutting operation—risk of injury to a person is mitigated, as is the risk of snagging another piece of equipment against the blade.

It will be appreciated that, during these movements, the sheath 222 reaches the end of its slot before the motor reaches its extreme position. The cutting sheath slot 512 thereby provides a mechanical stop against further movement of the sheath. Therefore, further movement of the motor towards its extreme position drives movement only of the blade 22 (not the sheath). The (in this example, spring-loaded) blade is therefore driven (against the action of the spring) out of the sheath 222 until the extreme motor position, which aligns with the cutting position (see FIGS. 4*b*, 6*c* and 7).

The controller then instructs the motor to move in the second direction. While the motor position moves from 180 to 90 degrees, the launch module does not move. The blade is retracted back into the sheath, but the sheath does not yet move through the sheath slot 512. At this point, the first brake is still applied. Since the tape is no longer adhered to the moving object, the first brake is sufficient to hold the tape against the tape launcher and the controller can hold the assembly in this configuration until a subsequent launch operation is desired. The retraction of the blade at this stage has the advantageous effect of ensuring that the blade is clear of the tape prior to a subsequent launch. Since the tape is adhesive, this avoids disruption due to undesired sticking of the tape to the cutting blade at the beginning of the following launch procedure.

When a subsequent launch operation is desired, the controller instructs the motor to move at a desired speed in the second direction from the holding position to 0 degrees. This causes the tape launcher to move further through the launch module slot 510 away from the second brake. When the motor reaches the 90 degrees positon, the post 505 (that is fixed on the assembly frame) engages the handle 506, which releases the first brake. Until this release point, the tape is effectively gripped between the first brake and the launcher. Therefore, at the release point, the tape is thrown (at a desired speed controlled by the speed of movement of the motor) towards the object. The speed of movement of the motor between the defined positions can be controlled to vary the launch speed (i.e. the speed at which the tape is thrown) as required. The desired speed is based upon object speed information.

After launched tape is adhered to an object (being conveyed by driven conveyors 4), the relative movement between the object and the assembly results in tape being pulled along through the launcher, and the tape imparts movement to the launch roller 21. As explained, in some embodiments, a one-way bearing ensures that if the motor is jolted in a reverse direction (perhaps due to interference at the time of cutting or throwing or depositing), then there is no reverse action imparted on to the launch roller—this prevents recoil of tape, which leads to more accurate tape positioning, cutting and dispensing.

Operation repeats from the 0 degrees position for as many cycles as desired. For bespoke situations, the precise control of one cycle may be different to an adjacent cycle. The controller can launch and cut in any desired pattern to account for different tapes, speeds, and objects. It will be appreciated that the invention is not limited to the above-described motor angle positions—in other embodiments, similar functions may be provided at different motor angles.

In this example, the tape cutter, brake and launcher are arranged such that a braking point occurs when the tape cutter is at or near the cutting position. Braking occurs at about the same time as (i.e. just before the blade contacts the tape or at the same time as the blade contacts the tape) the cutting.

When the tape is not being braked, the tape is free to move towards the object. When the tape is adhered to the object, the tape is pulled along by the action of the moving object without action from the tape launcher.

In this embodiment, after cutting, the arrangement is then held until a next tape piece is to be adhered to the object. The mechanism of this embodiment is efficient because each stage of motor movement carries out a useful function.

In this embodiment, the assembly comprises a cutter clearance mechanism arranged to move the blade 22 clear of the tape prior to initiating movement of the tape launcher. This provides a further technical advantage of ensuring that the tape is not launched against the cutter during the initial phase of the launch, which can cause issues such as causing the tape to undesirably curl prior to the cutter being withdrawn from the tape's path. The gearing between the cutter and the launcher is arranged such that the blade is moved away from the intended path of launched tape prior to the launch operation (i.e. prior to the release point in this embodiment). In this embodiment, the feature blade being moved away from the intended path is efficiently and safely achieved by the blade being retractable into its sheath; furthermore, the blade is spring-loaded back into its sheath.

In other embodiments, there is no gear arrangement between the cutter and the launcher. Instead, in some such embodiments, separate, co-ordinated drive mechanisms are provided for the tape launcher and the tape cutter. Movements of the tape launcher and the tape cutter are co-ordinated (e.g. by computer control) to provide a desired launching, braking and cutting sequences.

The sheath 222, in this embodiment, also constrains and guides movement of the blade 22, so that the blade is consistently presented to the tape during cutting. The sheath 222 guides movement of the blade in an arc relative to the tape, in this embodiment. An inclination angle of the blade relative to the tape is about 110 degrees upon entry into tape (when the tooth of the blade touches the tape) and is about 120 degrees upon exit from tape (when the blade has definitely cut the tape). The blade movement isn't entirely straight line—some rotational movement relative to the tape is also provided in this embodiment. In other embodiments, the specific angle might be different. In order to achieve this change in inclination angle (which results in a better cut), the blade 22 is rotatably mounted on the sheath 222.

In other embodiments, a different drive mechanism may be provided. For example, multiple motors may be provided. The tape launcher may be powered independently of the tape cutter, such as by independent motors. Launching and cutting would still be closely co-ordinated, e.g. via a computer controller to provide co-ordinated launching and cutting.

In this embodiment, the controller (not shown) is arranged to control operation of the tape launcher and tape cutter based on various received information. The received information includes object speed information relating to the relative speed of the object compared to the head assembly, and presence information relating to detection of the presence of the object at a first location (or, in other embodiments, a relative position of the object compared to the head assembly). As a result, tape is able to be deposited on objects that arrive in the deposition zone irregularly spaced apart (as shown schematically in FIG. 1), as well as when regularly spaced apart. Presence information and object speed information triggers timing of appropriate action of the tape launcher and tape cutter.

In this embodiment, the conveyor rollers 4 are driven at a desired speed in response to user input via a machine user interface. Therefore the object speed is known. This object speed information is sent to the controller via the machine or via the user interface, e.g. via wired or wireless communication device.

In other embodiments, there may be provided a conveyor roller speed sensor arranged to measure the actual speed of rotation of one or more of the conveyor rollers 4. In other embodiments, there may be provided a conveyor system speed sensor arranged to measure the actual speed of movement of the conveyor. Object speed information is thereby generated. This object speed information is then sent to the controller, e.g. via wired or wireless communication devices.

In other embodiments, there may be provided an object speed sensor located on the machine to detect the object speed and generate object speed information. This object speed information is then sent to the controller, e.g. via wired or wireless communication devices.

In other embodiments, the assembly may comprise an object speed sensor to detect the object speed and generate object speed information. The object speed information is then sent to the controller, e.g. via wired or wireless communication devices.

In some embodiments, the movement between the object and the head assembly is precisely predetermined or plotted, and the object speed information and presence (or position) information is known in advance—sensing is not required to arrive at the information. This may apply especially in cases where the head assembly moves and the object is stationary.

In embodiments where the object speed information is sensed by an object speed sensor, the object speed may be sensed close to the deposition zone, e.g. after the object has passed the first press roller 28, e.g. the object speed sensor may be located (either on the assembly or on the machine) between the first press roller and the deposition zone. Or, the object speed sensor may be located more remotely, but may sense speed in the region close to the deposition zone (e.g. between the first press roller and the deposition zone.

In this embodiment the head assembly 10 comprises a launch sensor 40 arranged to detect the presence of the object at the first location. The first location is upstream of the deposition zone 8, and conveyed objects pass by the first location shortly before arriving at the deposition zone, in this embodiment. Also, in this embodiment, the first location is in between the first press roller 28 and the deposition zone 8. A compact arrangement is thereby provided.

The launch sensor 40 generates the presence information. This presence information is then sent to the controller, e.g. via a wired or wireless communication device.

In other embodiments, the assembly does not comprise the launch sensor. Instead, the launch sensor is located remotely of the assembly, e.g. on the machine itself. In other embodiments a launch sensor is not needed because the precise pattern (velocity and position) of movement between the object or objects and the head assembly is pre-programmed.

In this embodiment, the assembly 10 comprises the controller. In other embodiments, the controller is located remotely of the assembly and communicates with the motor by, e.g., wired or wireless connection.

In response to the object speed information, the tape is launched at a specific speed, and cutting is synchronised therewith (based on the length of tape required). In response to the presence information, the tape is launched.

Given the object speed information and the presence information, the controller controls movement of the servomotor to drive movement of the tape launcher between its various configurations in a desired manner to achieve precise launching and cutting of tape pieces. Precisely launched tape adheres reliably to objects as a result. In this embodiment, the controller is arranged to control operation of the servomotor to drive the tape launcher to launch the tape immediately in response to an object's presence being detected. In some embodiments the object speed information is taken into account to introduce a delay as required for accurate desired initial contact position between the tape and the object.

The controller similarly controls movement of the tape cutter to the cutting configuration based on the required length of tape (e.g. programmed by a user) and the object speed information. Due to accurate attachment between the assembly and the machine, the time taken for the tape to travel between the tape launcher and the deposition zone, and the predicted time of arrival of the object at the deposition zone is precisely known or calculable.

Therefore, in response to the object speed information, the tape is launched at a certain speed, and cutting is synchronised. Similarly, in response to the presence information, the tape is precisely launched.

Modifications may be made to the invention without departing from its scope. For example, the tape launcher may not comprise rollers—it may comprise a linearly moveable launch mechanism.

The invention covers a dispenser head assembly and also a machine having the claimed assembly, as well as a method of automatically dispensing tape onto moving objects in an efficient manner.

In all embodiments, the dispenser head assembly is inventive in isolation of any machine to which it is installed, and may be used with different machines. A machine including the inventive dispenser head assembly comprises a further aspect of the invention.

The tape launcher may comprise an endless track instead of a roller.

Instead of a servomotor, another precisely controllable motor may be used in any embodiment.

In some embodiments, objects may be moved past the dispenser head assembly with a different moving arrangement other than a conveyor belt or conveyor rollers.

In some embodiments, any one or more of the controller, the launch sensor and the one or more object speed sensors may be on the head assembly (as described in one of the above-mentioned embodiments). In other embodiments, any one or more of the controller, the launch sensor and the one or more object speed sensors may not be on the head assembly—instead, any one or more of these components may be located on the machine only. In yet further embodiments, any one or more of the controller, the launch sensor and the one or more object speed sensors may be located remotely of on the head assembly and the machine—in the case of the launch sensor and the one or more object speed sensors, their location relative to the deposition zone would be known.

In general across all embodiments, tape cutting and depositing is improved relative to known systems by launch speed matching (i.e. ideally, the tape is launched such that the relative velocity between the tape and the object is about zero upon initial contact between the tape and the object) or two-sided cutting or two-sided launching or any combination thereof, amongst other things.

Figure 9:
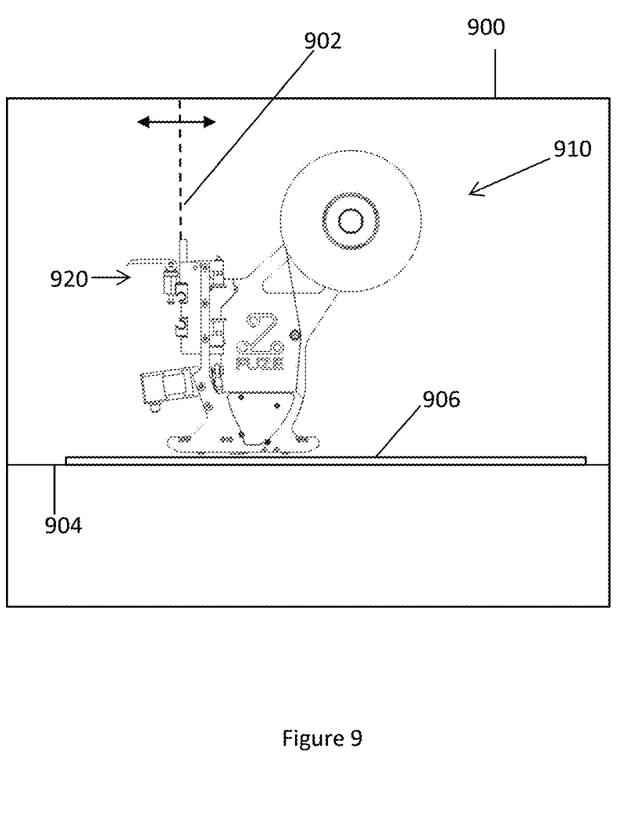
FIG. 9 shows schematically parts of a tape application machine according to another aspect of the invention.

The described embodiments largely relate to a fixed head assembly past which moving objects, upon which tape is to be deposited, move. In other embodiments, the inventive head assembly can be used with other arrangements. Any suitable relative movement mechanism arranged to provide relative movement between an object or objects upon which tape pieces are to be adhered and the head assembly can be provided. E.g. in FIG. 9 there is shown an X-Y plotter type machine 900, having a machine frame 902 to which is attached (via attachment device 920) a moving head assembly 910 (able to move across the machine in at least two orthogonal directions) and a fixed object 906 or substrate to which tape is to be adhered. The object is located on a stationary work bed 904—the positional alignment between the bed 904 and the object 906 is known, as is the positional alignment between the head assembly 910 and the machine 900 (via the machine frame 902), as is the positional alignment between the bed 904 and the machine 900—therefore, the precise alignment between the head assembly and the object 906 is also known. The size of the work area/bed is usually a few $m^2$, e.g. 2 m×3 m. In such machines, typically each object is aligned with the bed in a known position, and a controller (located on the assembly or on the machine) has access to, and is able to use, this information to control movement (including speed and position) of the head relative to the bed to deposit tape on the object in a desired manner. The head assembly of this invention can be used to provide reliable, consistent, high quality adhering of tape piece(s) in a similar manner to that described in relation to previous embodiments. The controller controls launching and cutting of the tape from the moving head assembly on to the stationary object taking into account the relative position and the relative speed between the head assembly and the object. All features of the previous embodiments can work with this embodiment. In other embodiments, both the head assembly and the object(s) move, and launching and cutting are controlled by taking into account the relative position and the relative speed between the head assembly and the object(s).

Figures 7, 8:
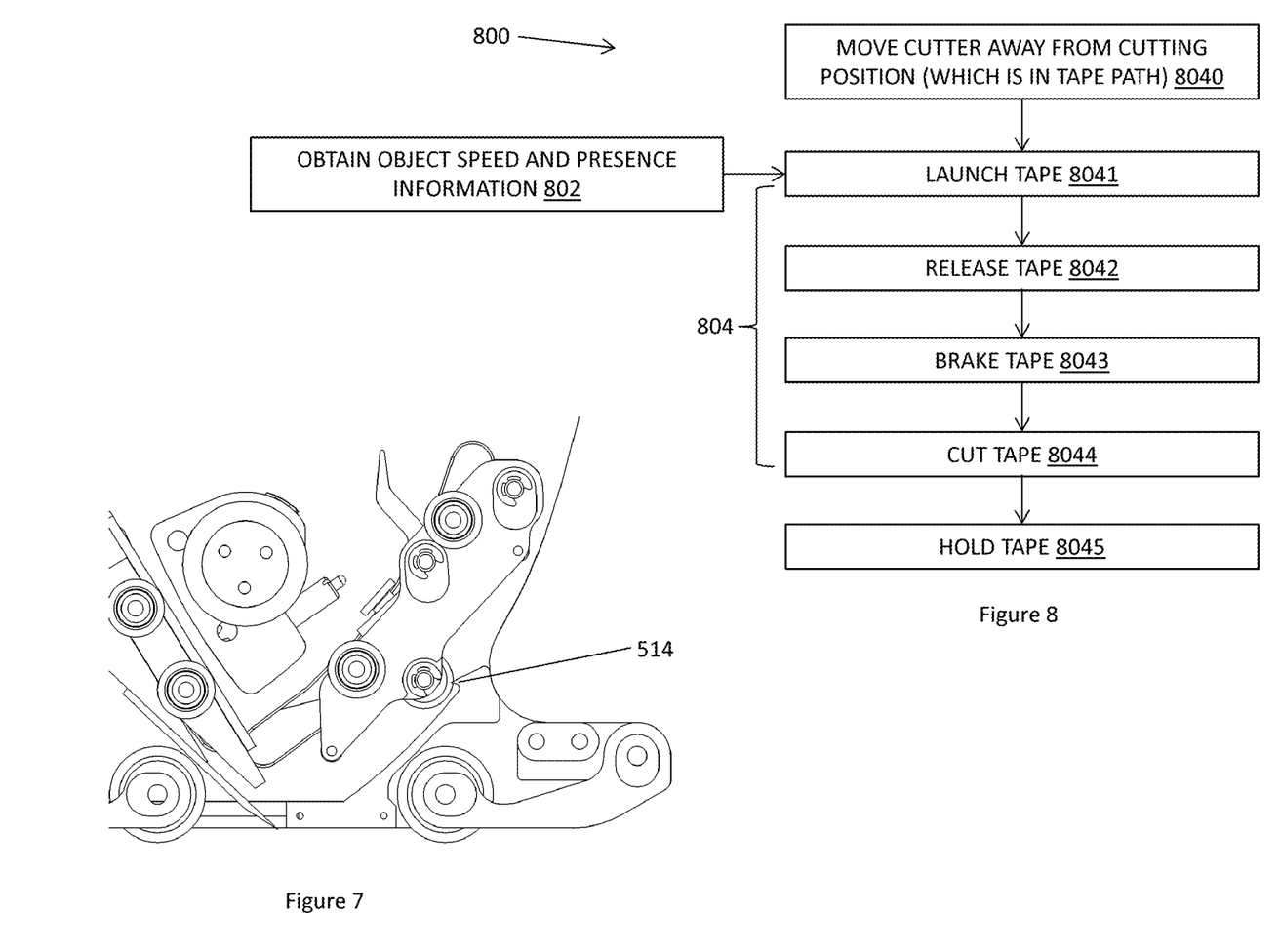
FIG. 7 shows schematically a closer view of parts of the tape dispenser head assembly of another embodiment.
FIG. 8 is a flowchart depicting a method according an aspect of the invention.

Referring to FIG. 8 a method 800 of an embodiment dispenses pieces of adhesive tape 12 onto a moving object 6. The method comprises: obtaining 802 object speed and presence information; and based on the object speed and presence information, using 804 the tape launcher, brake and cutter of any previously described embodiment to launch, cut and dispense pieces of adhesive tape onto the object. Upon initial contact between the tape and the object, the speed of the tape substantially matches the speed of the object. In this example the method is carried out by a computer controller. In some embodiments, at step 802, the controller has information passed to it by one or more sensors; in other embodiments, at step 802, the controller has knowledge (e.g. from pre-programming of the relative movement pattern between the object and the head assembly) of the object speed and presence (or position) information. The controller may request information on the relative movement between the head assembly and the object; or in other embodiments, the controller is passed said information without requesting.

Using 804 the tape launcher, brake and cutter of the invention to cut and dispense pieces of adhesive tape onto the object comprises (e.g. in response to detecting the presence of the object, or knowing that the object is a specific time or distance away from the deposition zone) moving 8040 the cutter away from the cutting position (i.e. moving the cutter out of the way of the tape path), launching 8041 the tape, releasing 8042 the tape (for a required time to achieve desired tape length—based on the tape launching speed, which itself is based on object speed information), braking 8043 the tape, shortly thereafter cutting the tape 8044 (at a co-ordinated time based on the required tape piece length taking into account the launched tape speed) and holding 8044 the tape (for as long as required based on the object speed and the desired spacing between tape pieces). As previously indicated, step 8040 is optional—some embodiments do not include this step.

Subsequently, in response to the next presence detection or when the next piece of tape is to be applied according to position information, the method comprises again moving 8040 the cutter away from the cutting position and then launching the tape—this may occur immediately or after a calculated delay time. The delay time is calculated based on the speed of object (from the object speed information) and the presence information and knowledge of the distance the tape has to travel from the tape moving cutter to the deposition zone where it first contacts the moving object. In some embodiments, the release and holding steps are optional.

In some embodiments, the moving object is conveyed on a conveyor system. In some embodiments, obtaining object speed information comprises determining the object speed from the conveyor system speed (e.g. by measuring the speed of the conveyor belt, or the conveyor roller(s) or a desired conveyor speed input by a user).

In other embodiments, obtaining object speed information comprises measuring the object speed (e.g. via an object speed sensor).

In other embodiments, the object speed information is input via a machine user interface or assembly head user interface, which is arranged to receive a desired speed input from a user, and obtaining object speed information comprises receiving (by the controller) a signal from the user interface (without having to directly sense speed of the object or of the moving conveyor system).

In some embodiments, object speed information (gathered via any of the above-mentioned options) is fed continuously to the controller. In other embodiments, the object speed information may be fed periodically (e.g. a few times a second, or every few seconds) to the controller. In other embodiments, the object speed information is passed to the controller when the desired speed is set (e.g. by a user via the user interface at the start of the tape depositing process for a particular roll of tape), and then again when the desired speed is changed (for example if a user alters a desired object speed on a machine user interface) or at the start of a new roll. In between desired speed changes, there may be no further object speed information passed to the controller—it is assumed that the speed is unchanged; or, there may be an object speed information update passed to the controller if no further object speed information has been passed to the controller for a predetermined time interval, e.g. 5 minutes—(useful in case conditions (e.g. environmental conditions) have changed sufficiently to materially affect the operation of the machine and thereby the object speed).

The described methods can work with a head assembly according to any of the described embodiments.

The invention claimed is:

1. An adhesive tape dispenser head assembly arranged to dispense pieces of adhesive tape onto an object, the assembly comprising:
    a feed spool arranged to hold adhesive tape;
    a tape launcher arranged to launch the adhesive tape onto the object;
    a first brake arranged to move between an applied position, in which the first brake is arranged to press the tape against the tape launcher, and an unapplied position;
    the tape launcher being arranged to move between a braked position, in which the first brake can be applied to the tape launcher, and an unbraked position, in which the tape is free to move relative to the tape launcher, the first brake remaining in the applied position initially as the tape launcher moves from the braked position to the unbraked position, such that the tape is gripped between the first brake and the tape launcher;
    a second brake arranged to facilitate positioning of the tape launcher in the braked position;
    a tape cutter movable between a cutting position, in which the tape cutter is arranged to cut the tape, and a non-cutting position; and
    a co-ordination mechanism arranged to co-ordinate relative movement between the tape launcher, the tape cutter, the first brake and the second brake such that when the tape cutter is in the cutting position, the tape launcher is in the braked position and the first brake is in the applied position.

2. The adhesive tape dispenser head assembly of claim 1, wherein subsequently, after the tape launcher moves from the braked position to the unbraked position, the first brake moves to the unapplied position such that the tape is freed and thereby launched onto the object.

3. The adhesive tape dispenser head assembly of claim 1, wherein the second brake comprises a wall or barrier arranged to abut against the tape launcher thereby facilitating positioning of the tape launcher in the braked position.

4. The adhesive tape dispenser head assembly of claim 1, wherein, when the tape launcher is in the braked position, the first brake and the second brake are arranged to press against the tape and the tape launcher from opposite sides.

5. The adhesive tape dispenser head assembly of claim 1, wherein the tape launcher comprises a rotating launch roller.

6. The adhesive tape dispenser head assembly of claim 5, wherein the rotating roller is a unidirectional rotating launch roller.

7. The adhesive tape dispenser head assembly of claim 4, wherein the second brake comprises a wall or barrier arranged to abut against the tape launcher thereby facilitating positioning of the tape launcher in the braked position, and wherein the tape launcher comprises a rotating launch roller, and wherein in the braked position, abutment of the launch roller with a wall or barrier is arranged to brake rotation of the launch roller.

8. The adhesive tape head assembly of claim 1, further comprising a cutter positioning mechanism arranged to facilitate positioning of the tape cutter in the cutting position.

9. The adhesive tape dispenser head assembly of claim 1, wherein the first brake comprises a handle arranged to facilitate manual movement of the first brake from the applied position to the unapplied position.

10. The adhesive tape dispenser head assembly of claim 1, wherein the first brake comprises a pivoted brake, the pivoted brake being arranged to pivot between the applied position and the unapplied position.

11. The adhesive tape dispenser head assembly of claim 1, wherein a brake release mechanism comprises a release member, the first brake being movable relative to the release member, and wherein the release member is arranged to bear against the first brake, optionally against a handle, to move the first brake during movement of the tape launcher from the braked position to the unbraked position.

12. The adhesive tape dispenser head assembly of claim 1, wherein the tape cutter comprises a sheath and a retractable blade therein, and wherein movement of the blade and sheath are controlled such that:
    the blade is retracted in the sheath in the non-cutting position;
    as the tape cutter moves from the non-cutting position to the cutting position:
        initially the blade is retracted in the sheath; and
        subsequently, prior and near to the cutting position, the blade is arranged to exit the sheath to cut the tape;
    as the tape cutter moves from the cutting position to the non-cutting position immediately after cutting the tape, the blade is arranged to retract into the sheath and subsequently the blade remains retracted in the sheath as the tape cutter moves to the non-cutting position.

13. The adhesive tape dispenser head assembly of claim 12, wherein the tape cutter comprises the sheath and a spring-loaded retractable blade therein, wherein the spring-loaded retractable blade is exposed from the sheath only near the cutting position immediately before and after cutting the tape.

14. The adhesive tape dispenser head assembly of claim 1, wherein the co-ordination mechanism comprises a co-ordinated drive mechanism arranged to drive relative movement between the tape launcher, tape cutter, first brake and second brake.

15. The adhesive tape dispenser head assembly of claim 1, wherein the tape cutter comprises a single blade arranged to cut the tape from only one side, and optionally wherein the blade comprises a profiled blade arranged to initially pierce the tape at a single location.

16. A tape application machine comprising a conveyor for conveying an object upon which tape is to be applied and an adhesive tape dispenser assembly according to claim 1 attached thereto and arranged to dispense pieces of adhesive tape onto the object.

* * * * *